UNITED STATES PATENT OFFICE.

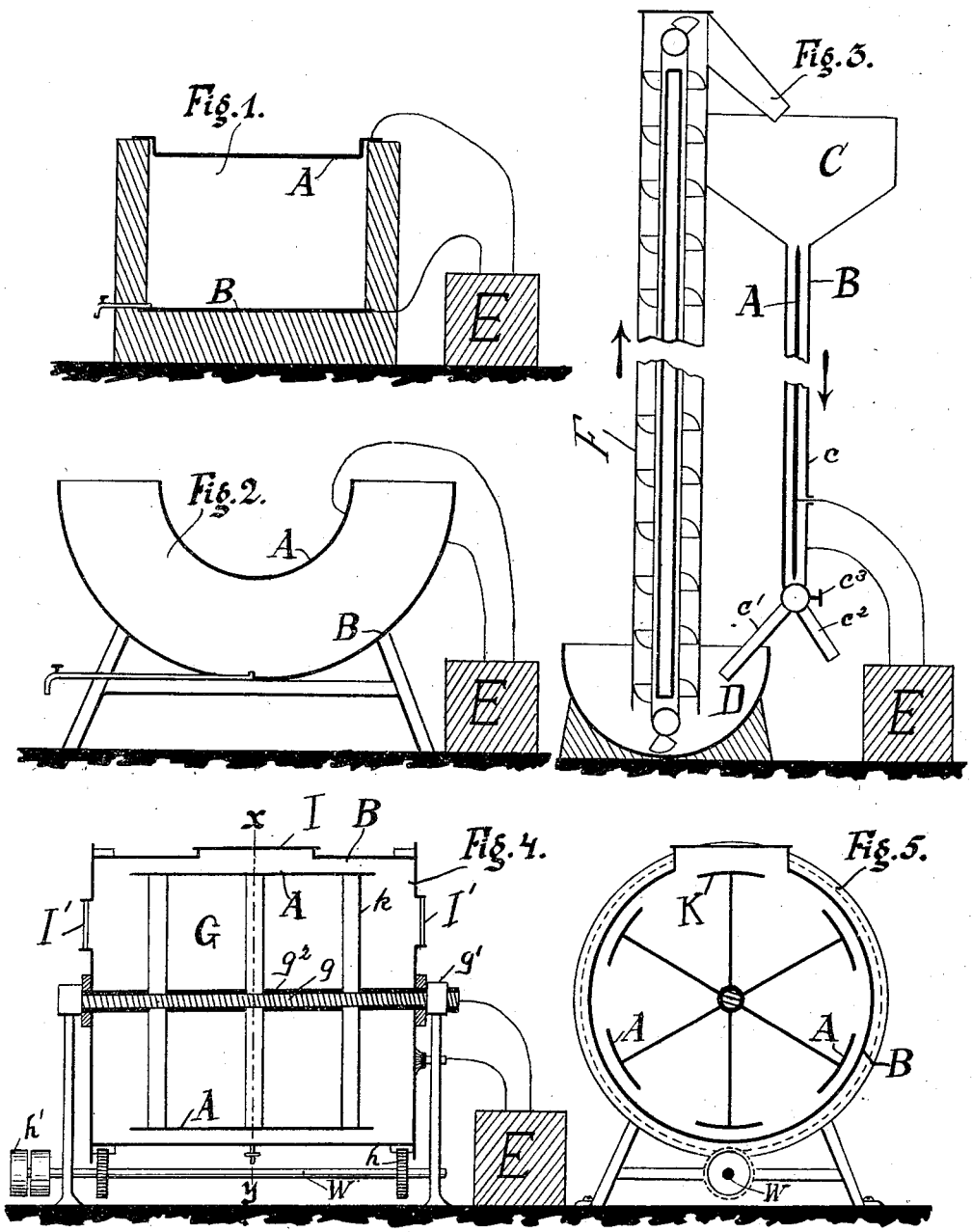

JOSEPH GEIGER, OF UERDINGEN, GERMANY, ASSIGNOR TO KATHREINER'S MALZKAFFEE FABRIKEN GESELLSCHAFT MIT BESCHRÄNKTER HAFTUNG, OF MUNICH, GERMANY.

PREPARING MALT COFFEE.

SPECIFICATION forming part of Letters Patent No. 632,108, dated August 29, 1899.

Application filed March 22, 1897. Renewed June 6, 1899. Serial No. 719,602. (No specimens.)

*To all whom it may concern:*

Be it known that I, JOSEPH GEIGER, a citizen of the German Empire, residing at Uerdingen, in the Kingdom of Prussia and German Empire, have invented a certain new and useful Method of Treating Grain, (for which I have obtained patents in the following countries: Belgium, April 30, 1896, No. 120,805; Denmark, October 1, 1896, No. 765; France, July 20, 1896, No. 255,440; Italy, July 27, 1896, No. 41,528; Norway, November 16, 1896, No. 5,021; Spain, July 14, 1896, No. 18,930; Germany, April 17, 1895, No. 90,735; Switzerland, August 26, 1896, No. 12,863; Sweden, April 22, 1896, No. 7,521; Portugal, November 20, 1896, No. 2,209; Austria, May 16, 1897, No. 47/1,772; Hungary, September 19, 1896, No. 8,584; England, April 14, 1896, No. 7,880/96, and Canada, January 12, 1898, No. 58,667,) of which the following is a specification.

My invention relates to the preparation of coffee substitutes from cereals.

The object of my invention is to treat grain for coffee substitutes and other purposes in such a way that it is free or partly free from unpleasant taste, due to the presence of certain ingredients in the grain. Coffee substitutes made of grain, and especially those made of barley, are well known to have an unpleasant burned taste, due to the products of decomposition (pyridine and its derivatives) of the protein substances existing between the skin and the starch of the grain, which occurs in the process of roasting. If an electric current is allowed to act upon the grain during the steeping process, which precedes the roasting, the substances which produce matter objectionable to the taste are altered in such a manner that in the subsequent roasting process a considerably smaller quantity of nitrogenous substances soluble in water are formed. A long series of practical experiments and analyses have shown that the nitrogenous matter soluble in water in coffee made of grain subjected to treatment with an electric current before being roasted is reduced more than fifty per cent. The action of the current is of course the more effective and beneficial the greater the uniformity with which it is allowed to act upon each individual grain during the steeping process. The distance between the electrodes is to be chosen as small as possible, and during the action of the electric current the grain may with advantage be moved.

As a practical example the following treatment of barley in the preparation of barley coffee may be given: The barley is steeped or soaked in water or in any other suitable liquid which is a good conductor of electricity, such as highly-diluted solutions of substances which are good conductors, such as sulfate of soda, at a temperature of from 20° to 70° centigrade. As soon as the interior of the grain has been well moistened as far as the starch body the steeping vessel is thrown into the circuit of a continuous current. The most advantageous for this purpose are currents of low tension (five to ten volts) and the strength, the duration of the current being proportioned to the quality and quantity of the barley operated on. Barleys poor in nitrogen require less current than those that are rich in it. For the former two hundred and fifty to fifteen hundred and for the latter five hundred to three thousand watts per one hundred pounds may be reckoned. After the current has been turned off or the vessel thrown out of its circuit the steeping-water may with advantage be changed once or several times until the whole grain is well moistened throughout. The grain is thereupon roasted and otherwise treated in the usual manner.

In the drawings I have shown several forms of apparatus for carrying out my invention, of which—

Figure 1 illustrates an ordinary tank provided with flat electrodes; Fig. 2, a curved tank; Fig. 3, a pair of tanks with a conveyer; Fig. 4, a rotary tank with stirrers, and Fig. 5 a side view of the same.

Referring to Fig. 1, it will be seen that the tank is provided with a pair of electrodes A and B, which are in circuit with a battery E. The tank is to be made of insulating material and is provided with a spigot, as shown, whereby the liquid may be withdrawn. In Fig. 2 the tank is in the form of a segment, the top and bottom being the electrodes, the sides being of insulating material. In both these constructions the grain and liquid are placed in the tanks, the liquid being in contact with both electrodes, whereby the circuit is closed and the current flows from the battery through the grain and liquid, thus accomplishing the results above described.

In Fig. 3 two tanks C and D are employed, the upper tank C being provided with a discharge-pipe $c$, within which is arranged an electrode A, connected to one pole of the battery E, the other pole of said battery being connected to the discharge-pipe. The foot of the said discharge-pipe is provided with two spouts, one of which, $c'$, is arranged to deliver into the lower tank D, while the other, $c^2$, discharges outside the said tank D and may be employed for drawing off the grain and liquid from the apparatus. A three-way cock $c^3$ serves to control the flow of grain and water through the spouts. The grain to be treated, together with a suitable liquid, are placed in the upper tank C and flow through the discharge-pipe $c$, thereby closing the electric circuit between the two electrodes, and thus causing an electric current to pass through the grain. The valve $c^3$ is arranged initially to close the spout $c^2$ and open the spout $c'$, whereby the grain will discharge into the lower tank D. As a single passage of the grain through the discharge-pipe $c$ will not always be sufficient to accomplish the desired result, an elevator F is provided, which, being operated by suitable motive mechanism, (not shown,) transfers the grain and water from the lower tank D to the upper tank C again, from which place it may again flow to the lower tank or, if desired, may be drawn off from the apparatus through the spout $c^2$ by a proper alteration of the three-way valve $c^3$.

In Figs. 4 and 5 I have shown a drum G mounted on a central shaft $g$, which is fixed in bearings $g'$ and is provided with an insulating-coating $g^2$. The drum G is rotated by suitable means, such as the gear-wheels $h$, driven by pulleys $h'$ and arranged to engage peripheral circular racks $h^2$ on the outside of the drum. The drum is provided with a circumferential manhole and cover I, whereby the grain may be supplied to or removed from the drum. In addition the lateral manholes and covers I may be provided to permit access to the interior. The shaft $g$ is provided with a plurality of radial arms $k$, arranged in longitudinal rows and connected by shoes K, which, together with their respective arms, form electrodes connected with one pole of the battery through the shaft $g$, as will be fully understood from the drawings. The drum itself forms the other electrode of the battery, the connection being made through a brush contact device $l$ in an obvious manner. In this construction the grain and liquid are supplied to the drum through one of the manholes, and the latter is then closed. The rotation of the drum in connection with the action of the arms $k$ and shoes K on the grain causes the latter to be thoroughly acted upon by the electric current, thus accomplishing the desired results.

What I claim as my invention is—

1. The process of treating cereals in the production of cereal coffee which consists in steeping the cereals and then passing a current of electricity through the cereals during the steeping process whereby a substantial portion of the nitrogenous substances existing between the skin and the starch body of the grain is rendered insoluble, substantially as set forth.

2. The process of treating grain or cereals which consists in immersing the same in a liquid which is a good conductor of electricity and then, after the grain has been well moistened as far as the starch body, passing an electric current through the same.

3. The process of treating grain or cereals which consists in adding to the same a liquid which is a good conductor of electricity and then, after the grain has been sufficiently moistened passing an electric current through the same, then turning off the current, and then continuing the steeping until the grain or cereals have been thoroughly moistened.

4. The process of treating grain which consists in adding to the same a liquid which is a good conductor of electricity and allowing the same to partially soak the grain, then passing an electric current through the same, then turning off the current and then continuing the steeping and changing the steeping liquid and finally roasting the grain so treated.

In testimony that I claim the foregoing as my invention I have signed my name in presence of two subscribing witnesses.

JOSEPH GEIGER.

Witnesses:
FRITZ SCHEILLER.
AUG. LAMBERT.